(12) United States Patent
Wolfram et al.

(10) Patent No.: US 8,812,298 B1
(45) Date of Patent: Aug. 19, 2014

(54) MACRO REPLACEMENT OF NATURAL LANGUAGE INPUT

(75) Inventors: Stephen Wolfram, Champaign, IL (US); Peter Overmann, Champaign, IL (US)

(73) Assignee: Wolfram Alpha LLC, Champaign, IL (US)

( * ) Notice: Subject to any disclaimer, the term of this patent is extended or adjusted under 35 U.S.C. 154(b) by 724 days.

(21) Appl. No.: 12/845,441

(22) Filed: Jul. 28, 2010

(51) Int. Cl.
*G06F 17/27* (2006.01)

(52) U.S. Cl.
USPC ............................... 704/9; 704/251; 704/257

(58) Field of Classification Search
USPC ............ 704/1–10, 251, 255, 257, 270, 270.1, 704/231, 235; 1/1
See application file for complete search history.

(56) References Cited

U.S. PATENT DOCUMENTS

| | | | |
|---|---|---|---|
| 4,734,854 A | 3/1988 | Afshar | |
| 4,740,886 A | 4/1988 | Tanifuji et al. | |
| 4,841,441 A | 6/1989 | Nixon et al. | |
| 4,949,253 A | 8/1990 | Chigira et al. | |
| 5,038,296 A | 8/1991 | Sano | |
| 5,315,710 A | 5/1994 | Kishimoto et al. | |
| 5,394,509 A | 2/1995 | Winston | |
| 5,448,740 A | 9/1995 | Kiri et al. | |
| 5,485,601 A | 1/1996 | Ching | |
| 5,499,371 A | 3/1996 | Henninger et al. | |
| 5,555,367 A | 9/1996 | Premerlani et al. | |
| 5,559,939 A | 9/1996 | Wada et al. | |
| 5,634,024 A | 5/1997 | Yamaguchi | |
| 5,640,576 A | 6/1997 | Kobayashi et al. | |
| 5,696,962 A | 12/1997 | Kupiec | |
| 5,768,590 A | 6/1998 | Kimura et al. | |
| 5,815,713 A | 9/1998 | Sanders | |
| 5,815,717 A | 9/1998 | Stack | |
| 5,987,505 A | 11/1999 | Fry et al. | |
| 6,038,560 A | 3/2000 | Wical | |
| 6,076,051 A | 6/2000 | Messerly et al. | |
| 6,084,585 A | 7/2000 | Kraft et al. | |
| 6,169,986 B1 | 1/2001 | Bowman et al. | |
| 6,173,441 B1 | 1/2001 | Klein | |
| 6,216,139 B1 | 4/2001 | Listou | |
| 6,256,665 B1 | 7/2001 | Fry et al. | |

(Continued)

FOREIGN PATENT DOCUMENTS

| | | |
|---|---|---|
| EP | 0 442 240 A2 | 8/1991 |
| WO | WO-97/40425 A2 | 10/1997 |
| WO | WO-2006/014892 A2 | 2/2006 |
| WO | WO-2006/015006 A2 | 2/2006 |

OTHER PUBLICATIONS

"AppleScript," Wikipedia.

(Continued)

*Primary Examiner* — Huyen X. Vo
(74) *Attorney, Agent, or Firm* — Drinker Biddle & Reath LLP

(57) ABSTRACT

In a method of creating a natural language (NL) macro, a first term/phrase and a second term/phrase in an imprecise syntax are obtained, and an association between the first and the second terms/phrases is created. The association is stored as an NL macro. In a method of using an NL macro in an NL query, it is determined that an original NL query includes an NL macro, and the NL macro is replaced with its corresponding NL value to form a revised NL query. The revised NL query is processed to generate one or more answers.

7 Claims, 12 Drawing Sheets

(56) References Cited

U.S. PATENT DOCUMENTS

| | | |
|---|---|---|
| 6,275,976 B1 | 8/2001 | Scandura |
| 6,289,513 B1 | 9/2001 | Bentwich |
| 6,493,694 B1 | 12/2002 | Xu et al. |
| 6,502,236 B1 | 12/2002 | Allen et al. |
| 6,505,157 B1 | 1/2003 | Elworthy |
| 6,584,464 B1 | 6/2003 | Warthen |
| 6,589,290 B1 | 7/2003 | Maxwell et al. |
| 6,675,159 B1 | 1/2004 | Lin et al. |
| 6,684,388 B1 | 1/2004 | Gupta et al. |
| 6,704,728 B1 | 3/2004 | Chang et al. |
| 6,742,162 B2 | 5/2004 | Bennett |
| 6,876,314 B1 | 4/2005 | Lin |
| 6,877,155 B1 | 4/2005 | Lindsey |
| 6,901,399 B1 | 5/2005 | Corston et al. |
| 6,973,640 B2 | 12/2005 | Little et al. |
| 6,996,801 B2 | 2/2006 | Yoneyama |
| 7,013,300 B1 * | 3/2006 | Taylor ................................. 1/1 |
| 7,120,574 B2 | 10/2006 | Troyanova et al. |
| 7,137,100 B2 | 11/2006 | Iborra et al. |
| 7,197,739 B2 | 3/2007 | Preston et al. |
| 7,222,333 B1 | 5/2007 | Mor et al. |
| 7,231,343 B1 * | 6/2007 | Treadgold et al. ............. 704/9 |
| 7,263,517 B2 | 8/2007 | Sheu et al. |
| 7,269,822 B2 | 9/2007 | Gebhart et al. |
| 7,373,291 B2 | 5/2008 | Garst |
| 7,440,968 B1 | 10/2008 | Oztekin et al. |
| 7,451,135 B2 | 11/2008 | Goldman et al. |
| 7,454,701 B2 | 11/2008 | Graeber |
| 7,613,676 B2 | 11/2009 | Baisley et al. |
| 7,620,935 B2 | 11/2009 | Baisley et al. |
| 7,685,507 B2 | 3/2010 | Workman et al. |
| 7,747,601 B2 | 6/2010 | Cooper et al. |
| 7,747,981 B2 | 6/2010 | Gray |
| 7,844,594 B1 | 11/2010 | Holt et al. |
| 8,091,024 B2 | 1/2012 | Graeber |
| 8,135,696 B2 | 3/2012 | Safoutin |
| 2002/0099743 A1 | 7/2002 | Workman et al. |
| 2002/0116176 A1 | 8/2002 | Tsourikov et al. |
| 2002/0140734 A1 | 10/2002 | Bennett |
| 2002/0143810 A1 | 10/2002 | Bennett |
| 2002/0174120 A1 | 11/2002 | Zhang et al. |
| 2003/0145022 A1 | 7/2003 | Dingley |
| 2003/0191765 A1 | 10/2003 | Bargh et al. |
| 2004/0001109 A1 | 1/2004 | Blancett et al. |
| 2004/0049499 A1 | 3/2004 | Nomoto et al. |
| 2004/0088158 A1 | 5/2004 | Sheu et al. |
| 2004/0103405 A1 | 5/2004 | Vargas |
| 2004/0128649 A1 | 7/2004 | Grundy et al. |
| 2005/0005258 A1 | 1/2005 | Bhogal et al. |
| 2005/0080780 A1 | 4/2005 | Colledge et al. |
| 2005/0097464 A1 | 5/2005 | Graeber |
| 2006/0020886 A1 | 1/2006 | Agrawal et al. |
| 2006/0025987 A1 | 2/2006 | Baisley et al. |
| 2006/0026576 A1 | 2/2006 | Baisley et al. |
| 2006/0136411 A1 | 6/2006 | Meyerzon et al. |
| 2006/0271908 A1 | 11/2006 | Bargh et al. |
| 2006/0279799 A1 | 12/2006 | Goldman |
| 2007/0022109 A1 | 1/2007 | Imielinski et al. |
| 2007/0043574 A1 | 2/2007 | Coffman et al. |
| 2007/0106657 A1 | 5/2007 | Brzeski et al. |
| 2007/0203929 A1 | 8/2007 | Bolivar |
| 2007/0208722 A1 | 9/2007 | Dettinger et al. |
| 2007/0220034 A1 | 9/2007 | Iyer et al. |
| 2008/0016040 A1 | 1/2008 | Jones et al. |
| 2008/0066052 A1 | 3/2008 | Wolfram |
| 2009/0055733 A1 | 2/2009 | Graeber |
| 2009/0171923 A1 | 7/2009 | Nash et al. |
| 2010/0004924 A1 | 1/2010 | Paez |
| 2010/0293174 A1 | 11/2010 | Bennett et al. |

OTHER PUBLICATIONS

"Area calculator", http://www.calculator.com, 1 page, Aug. 15, 2006.
"calculator.com", http://www.calculator.com, 2 pages, Aug. 15, 2006.
"Car Lease Calculator", http://www.calculator.com, 1 page, Aug. 15, 2006.
"Currency Calculator", http://www.calculator.com, 1 page, Aug. 15, 2006.
"Fractions calculator", http://www.calculator.com, 1 page, Aug. 15, 2006.
"General Loan Calculator", http://www.calculator.com, 1 page, Aug. 15, 2006.
"Google Code," <http://code.google.com/>, Mar. 17, 2005, p. 1-11.
"Graphing calculator", http://www.calculator.com, 1 page, Aug. 15, 2006.
"Home—Finance", http://www.calculator.com, 2 pages, Aug. 15, 2006.
"Home Equity Calculator", http://www.calculator.com, 1 page, Aug. 15, 2006.
"How Much Can I Afford Calculator", http://www.calculator.com, 1 page, Aug. 15, 2006.
"Length Adding Calculator", http://www.calculator.com, 1 page, Aug. 15, 2006.
"Love Calculator", http://www.calculator.com, 1 page, Aug. 15, 2006.
"Mortgage Payment Calculator", http://www.calculator.com, 1 page, Aug. 15, 2006.
"Mortgage Qualification Calculator", http://www.calculator.com, 1 page, Aug. 15, 2006.
"Percent calculator", http://www.calculator.com, 1 page, Aug. 15, 2006.
"Rent versus Buy Calculator", http://www.calculator.com, 1 page, Aug. 15, 2006.
"Scientific calculator", http://www.calculator.com, 1 page, Aug. 15, 2006.
"Standard calculator", http://www.calculator.com, 1 page, Aug. 15, 2006.
"Temperature calculator", http://www.calculator.com, 1 page, Aug. 15, 2006.
"The Mortgage Calculator," <http://www.hughchou.org/calc/mortold.html>, Aug. 8, 1996, p. 1-7.
"Time Calculator", http://www.calculator.com, 1 page, Aug. 15, 2006.
"Unit Conversion Calculator", http://www.calculator.com, 1 page, Aug. 15, 2006.
Adorni, et al., "Natural Language Input for Scene Generation," Proceedings of the first conference on European Chapter of the Association for Computational Linguistics, pp. 175-182 (1983).
Asperti et al., "A content based mathematical search engine: Whelp," 2004, p. 1-15.
Jones et al., "Generating Query Substitutions," ACM WWW 2006, May 23-26, 2006, pp. 387-396.
Kamareddine et al., "Restoring Natural Language as a Computerised Mathematics Input Method," Proceedings of the 14th symposium on Towards Mechanized +Mathematical Assistants: 6th International Conference, pp. 280-295 (2007).
Lavrov, "Program Synthesis," Cybernetics and Systems Analysis, vol. 18, No. 6 pp. 708-715 (Nov. 1982).
Moore, Gregory M., "Calculator Code: Programming Code for Use within a Scientific Calculator," Fall 2005, p. 1-29.
Myers et al., "Natural Programming Languages and Environments," Communications of the ACM, vol. 47, No. 9, pp. 47-52 (Sep. 2004).
Office Action for related U.S. Appl. No. 12/780,685, dated Feb. 15, 2012.
Office Action for related U.S. Appl. No. 12/780,705, dated Jan. 31, 2012.
Osogami, "A Study of Input and Output Conditions for Automatic Program Generation," Memoirs of the Fukui Institute of Technology, vol. 37 pp. 273-278 (2007).
Sucan, Ioan Alexandru, "A Search Engine for Mathematical Formulae," May 7, 2006, p. 1-17.
Trott, Michael, "Mathematical Searching of The Wolfram Functions Site," 2005, The Mathematica Journal, p. 713-726.

(56) References Cited

OTHER PUBLICATIONS

Trott, Michael, "The Functions Website," 2003, The Mathematical Journal, p. 1-10.

Wang et al., "Mining Term Association Patterns from Search Logs for Effective Query Reformulation," ACM CIKM 2008, Oct. 26-30, 2008, pp. 479-488.

Meyers, A., "VOX—An Extensible Natural Language Processor," http://dli.iiit.ac.in/ijcai/IJCAI-85-VOL2/PDF/026.pdf, accessed Mar. 8, 2010, 5 pages.

Estival et al., "Towards Ontology-Based Natural Language Processing," http://acl.Idc.upenn.edu/acl2004/nIpxml/pdf/estival-etal.pdf, accessed Mar. 8, 2010, 8 pages.

\* cited by examiner

620

*ACME Outerwear Financials*

|    | A | B | C | D | E |
|----|---|---|---|---|---|
| 1  | Employee | Home Office | Country | Month | Sales |
| 2  |  |  |  |  |  |
| 3  | G. Arthur | New York | Japan | May-09 | 7.7 |
| 4  | G. Arthur | New York | USA | Jun-09 | 1.8 |
| 5  | M. Fuentes | New York | England | Jun-09 | 0.3 |
| 6  | A. Sharma | Seattle | Japan | Jun-09 | 0.9 |
| 7  | B. Jones | Chicago | France | Jul-09 | 6.7 |
| 8  | G. Arthur | New York | China | Jul-09 | 2.5 |
| 9  | R. O'Connor | New York | England | Jul-09 | 6.7 |
| 10 | A. Smith | Chicago | Canada | Aug-09 | 5.7 |
| 11 | E. Rhys-Wood | Dallas | France | Aug-09 | 3.4 |
| 12 | E. Rhys-Wood | Dallas | Canada | Aug-09 | 2.8 |
| 13 | P. Park | Dallas | Korea | Aug-09 | 0.6 |
| 14 | M. Fuentes | New York | Mexico | Aug-09 | 3.8 |
| 15 | P. Park | Dallas | Mexico | Sep-09 | 4.3 |
| 16 | R. O'Connor | New York | Canada | Sep-09 | 4.5 |
| 17 | B. Jones | Chicago | USA | Oct-09 | 5.1 |
| 18 | P. Park | Dallas | USA | Oct-09 | 5 |
| 19 | A. Smith | Chicago | France | Nov-09 | 1.2 |
| 20 | C. Wilson | Chicago | France | Nov-09 | 4.9 |
| 21 | L. Robinson | New York | Mexico | Nov-09 | 3 |
| 22 | C. Wilson | Chicago | England | Dec-09 | 5.6 |
| 23 | L. Robinson | New York | USA | Jan-10 | 0.8 |
| 24 | B. Beckman | Seattle | France | Jan-10 | 3.6 |
| 25 | B. Beckman | Seattle | USA | Jan-10 | 4.6 |
| 26 | B. Beckman | Seattle | China | Jan-10 | 6.5 |
| 27 | B. Jones | Chicago | Japan | Feb-10 | 7.8 |
| 28 | L. Robinson | New York | Canada | Feb-10 | 1.1 |
| 29 | C. Wilson | Chicago | Canada | Mar-10 | 0.9 |
| 30 | R. O'Connor | New York | USA | Mar-10 | 2.1 |
| 31 | A. Sharma | Seattle | USA | Mar-10 | 5 |
| 32 | H. Lee | Seattle | Canada | Mar-10 | 2.1 |
| 33 | A. Smith | Chicago | USA | Apr-10 | 7 |
| 34 | E. Rhys-Wood | Dallas | Mexico | Apr-10 | 4.4 |
| 35 | H. Lee | Seattle | Japan | Apr-10 | 3.2 |
| 36 | H. Lee | Seattle | Korea | May-10 | 0.9 |
| 37 | M. Fuentes | New York | France | Jun-10 | 4.4 |
| 38 | A. Sharma | Seattle | Canada | Dec-10 | 2.2 |

725 — Enter an NL query:

728 — What portion of sales in target market during first year is attributable to the Chicago office?

730 — Get results        740 — Save as macro

Input Interpretation:

732 —

| Sales | A.Smith, B.Jones, C.Wilson |
| | France |
| | May 2009 - May 2010 |

738a — Result:  35% of sales

738b — Total sales breakdown:

Chicago 35%
New York 27%
Seattle 21%
Dallas 16%

738c — Sales per office:

- Chicago 44.9
- Dallas 20.5
- New York 34.3
- Seattle 26.8

MACRO REPLACEMENT OF NATURAL LANGUAGE INPUT

TECHNICAL FIELD

This disclosure generally relates to natural language processing, and more particularly, to systems that provide answers to natural language queries.

BACKGROUND

A user may input a query or an indication of a query into a natural language query answering application or system. The query may be in an imprecise syntax or natural language. For example, the user may desire to determine a formula, (e.g., a fact, rule, or principle expressed in scientific, mathematical, technical, etc., symbols), and may input a corresponding query into the natural language query answering system. The inputted indication may be in ASCII text, for example, and may include technical shorthand, technical abbreviations, pseudocode, etc. In response, the natural language query answering system may determine one or more formulas corresponding to the user's input. Optionally, other outputs related to the query may be generated. In another example, the user may enter a non-formulaic query, such as "What is the weather in Chicago, Ill.?" The natural language query answering system may determine one or more results, and the results and related output(s) are presented to the user.

SUMMARY

In one embodiment, a method of creating a natural language (NL) macro for a natural language query answering application or system includes obtaining a first term or phrase in an imprecise syntax, obtaining a second term or phrase in an imprecise syntax, generating an association between the first term/phrase and the second term/phrase, and storing the association as a natural language macro. In other embodiments, the method includes determining a suggested value of the second term or phrase, and providing macro management functions such as deleting, modifying, or searching for a particular natural language macro. In some embodiments, the natural language macro may expire when a user's session ends, or may persist across multiple sessions of a user.

In another embodiment, a method of using an natural language (NL) macro in a NL query includes receiving an original NL query, determining that the original NL query includes one or more NL macros, replacing the one or more NL macros with one or more corresponding NL values to form a revised NL query, processing the revised NL query to generate an answer, and providing an output corresponding to the generated answer. In another embodiment, the method may include accessing or processing at least a portion of a previously provided file or other data to generate at least a portion of the answer.

In yet another embodiment, a system for answering natural language queries includes a first portion configured to generate a natural language (NL) macro, a second portion configured to generate one or more answers to an NL query, and a third portion configured to detect the NL macro in an original NL query, replace the NL macro with its NL value to form a revised NL query, and provide the revised NL query to the second portion. In another embodiment, the first portion includes a macro manager and a macro database, the second portion includes a parser to generate one or more expressions and a system to generate one or more results based on the one or more expressions, and the third portion includes a macro recognizer. In another embodiment, the system includes a macro assistant configured to determine a suggested value of a NL macro.

BRIEF DESCRIPTION OF THE DRAWINGS

FIGS. 6A, 6B and 6C illustrate an example of defining a natural language macro based on a user-provided file or data, and using more than one natural language macro in a query;

FIGS. 7A, 7B and 7C an example of defining a natural language macro based on a query result.

DETAILED DESCRIPTION

Figure 1:
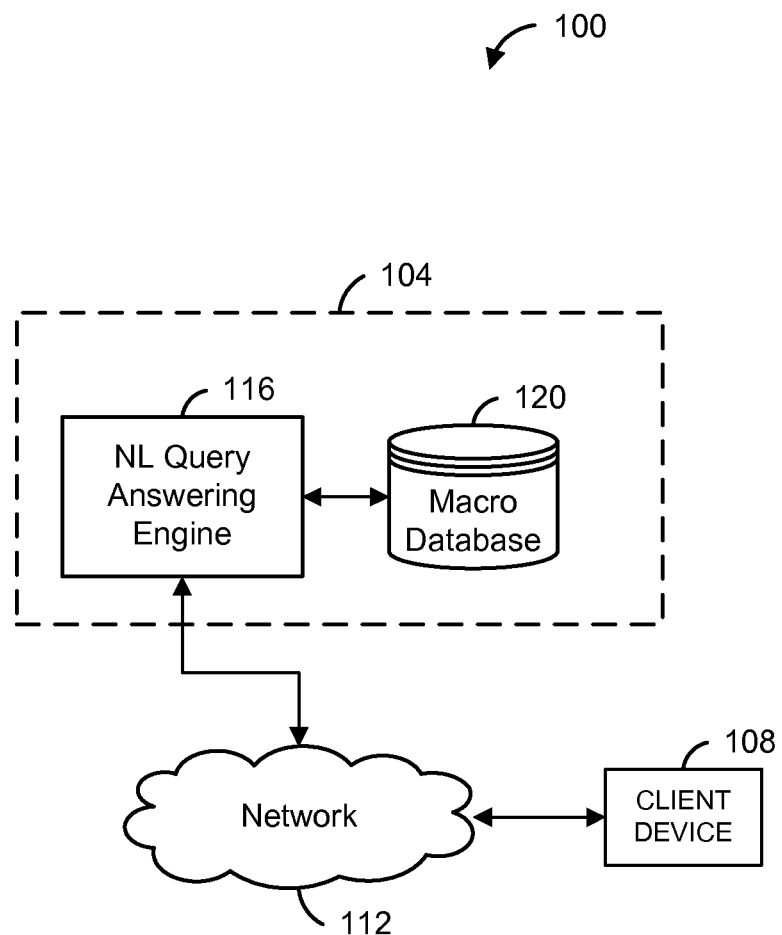
FIG. 1 is a block diagram of an example system in which methods and techniques described herein may be implemented.

FIG. 1 is a high level block diagram of an example system 100 that processes natural language (NL) queries and generates answers (and, in some embodiments, information related to the answers) in response to the NL queries. The system 100 comprises an NL query answering system 104. In an embodiment, the NL query answering system 104 comprises a system the same as or similar to the system described in U.S. patent application Ser. No. 11/852,044, entitled "Methods and Systems for Determining a Formula," and filed on Sep. 7, 2007, which is hereby incorporated by reference herein in its entirety. The system 100 also includes a client device 108 communicatively coupled to the NL query answering system 104 via a network 112. The client device transmits NL queries to the NL query answering system 104 via the network 112, and the NL query answering system 104, in response, transmits answers and, in some embodiments, information related to the answers to the client device 108 via the network 112. In some embodiments, the network 112 may be omitted and the client device 108 may be directly coupled to the NL query answering system 104.

As used herein, the term "natural language" refers to language in a natural or imprecise syntax, such as a human-readable language. Natural language or language using an imprecise syntax is in contrast to a typical computer programming language syntax, in which exact spelling, exact placement of punctuation, exact placement of parentheses, etc. is necessary to specify a particular formula or expression. Similarly, with typical computer programming language syntax, a slight change in punctuation, for example, could specify a completely different formula or expression, or could render a computer language statement meaningless to a compiler. On the other hand, with an imprecise syntax, a formula can be expressed using language and terms that may be readily understandable to a human, but unintelligible to a computer program such as a compiler. Additionally, with an imprecise syntax, many different variations of language and terms and groupings of language and terms may correspond to one formula. Of course, imprecise syntaxes are not limited to expressing only formulas, but may express any concepts that are conveyable by human-readable language.

Turning back to FIG. 1, the example NL query answering system 104 includes an NL query answering engine 116 coupled to a macro database 120. The NL query answering engine 116 processes NL queries from the client device 108 and generates answers and, in some embodiments, generates information related to the answers in response to the NL queries. The macro database 120 stores information regarding NL macros, where the NL macros are typically (but not necessarily) defined by a user. An NL macro is a first term or phrase that represents a second term or phrase, and wherein the second term or phrase is for use in an NL query to an NL query answering system. For example, a user may define an NL macro "My Location" to represent a term or phrase, such as "Chicago, Ill." As used herein, the first term or phrase is referred to as "NL macro" or "macro," and the second term or phrase which is represented by the NL macro is referred to as "NL macro value," "macro value" or "value."

The macro database 120 stores information regarding NL macros, such as a first term or phrase, the corresponding second term or phrase represented by the first term of phrase, and an indication of their association. The NL query answering engine 116, upon receiving an NL query, identifies NL macros in the NL query based on the information stored in the macro database 120, and replaces the NL macros with the corresponding macro values. Continuing with the example discussed above, if a query includes the phrase "My Location", the NL query answering engine 116 replaces the phrase "My Location" in the query with the phrase "Chicago, Ill."

Typically, a natural language macro is defined by a user. For example, a user may define a NL macro "my morning commute" to represent the natural language expression "I-90 from Arlington Heights, Ill. to downtown Chicago, Ill.". Subsequent natural language queries may then incorporate the defined macro, e.g., "What is average commute time of my morning commute at 7:00 a.m.?" or "How much gas used for my morning commute?"

In some cases, the user may define an NL macro to reference a portion of an object or file that is stored and is accessible to an NL query answering engine. For example, suppose the user has stored, in a location accessible by the NL query answering engine 116, a spreadsheet identified in natural language as "ACME Outerwear Financials." The user may define an NL macro "June 2009 Earnings" as "the second column of the ACME Outerwear Financials." Subsequent natural language queries may incorporate the defined macro "June 2009 Earnings," e.g., "Plot June 2009 Earnings," or "What is sum of June 2009 Earnings?" Multiple NL macros may be included in a single query. In some cases, natural language macros may be nested, e.g., a new NL macro "Chicago June 2009 Earnings" may be defined to be "fourth row of June 2009 Earnings."

The NL query answering system 104 may be configured and located to service a plurality of client devices. For example, the NL query answering system 104 may be implemented via a website that resides on a server or a group of networked computing devices such as a privately-networked group of computing devices, a peer-to-peer network, a computing cloud, or the like. The network 112 may be a private network, a public network such as the Internet, or some combination of private and public networks. Thus, although FIG. 1 illustrates one client device 108, in some embodiments there are a plurality of client devices 108.

In some embodiments, the NL query answering engine 116 may wholly reside on the client computing device 108, so that the client device 108 does not need to communicate with another device in order to perform natural language query answering. In some embodiments, a portion of the NL query answering engine 116 may reside on the client device 108, and another portion of the NL query answering system may be centrally located and accessible to multiple client devices. For example, a user interface portion of the NL query answering engine 116 may reside on the client computing device 108, and a query answering engine portion may be accessible via a server.

The macro database 120 may be a component or module residing on the same computing system as the NL query answering engine 116. Alternatively, the macro database 120 may be implemented on a computing system different from but communicatively coupled to the computing system that executes the NL query answering engine 116.

In another embodiment, the macro database 120 is included in the client device 108, and may include, for example, cookies and/or a database that is local to the client device. In this embodiment, the client device 108 identifies NL macros in an NL query and replaces the NL macros with the terms/phrases that the NL macros represent from the local macro database prior to transmitting the NL query to the NL query answering system 104. In other embodiments (not shown), a portion of the macro database 120 is included in the client device 108, and another portion of the macro database 120 is included in the NL query answering system 104.

In another embodiment, the client device 108 and the network 112 are omitted, and a user enters queries directly into the NL query answering system 104.

Figure 2:
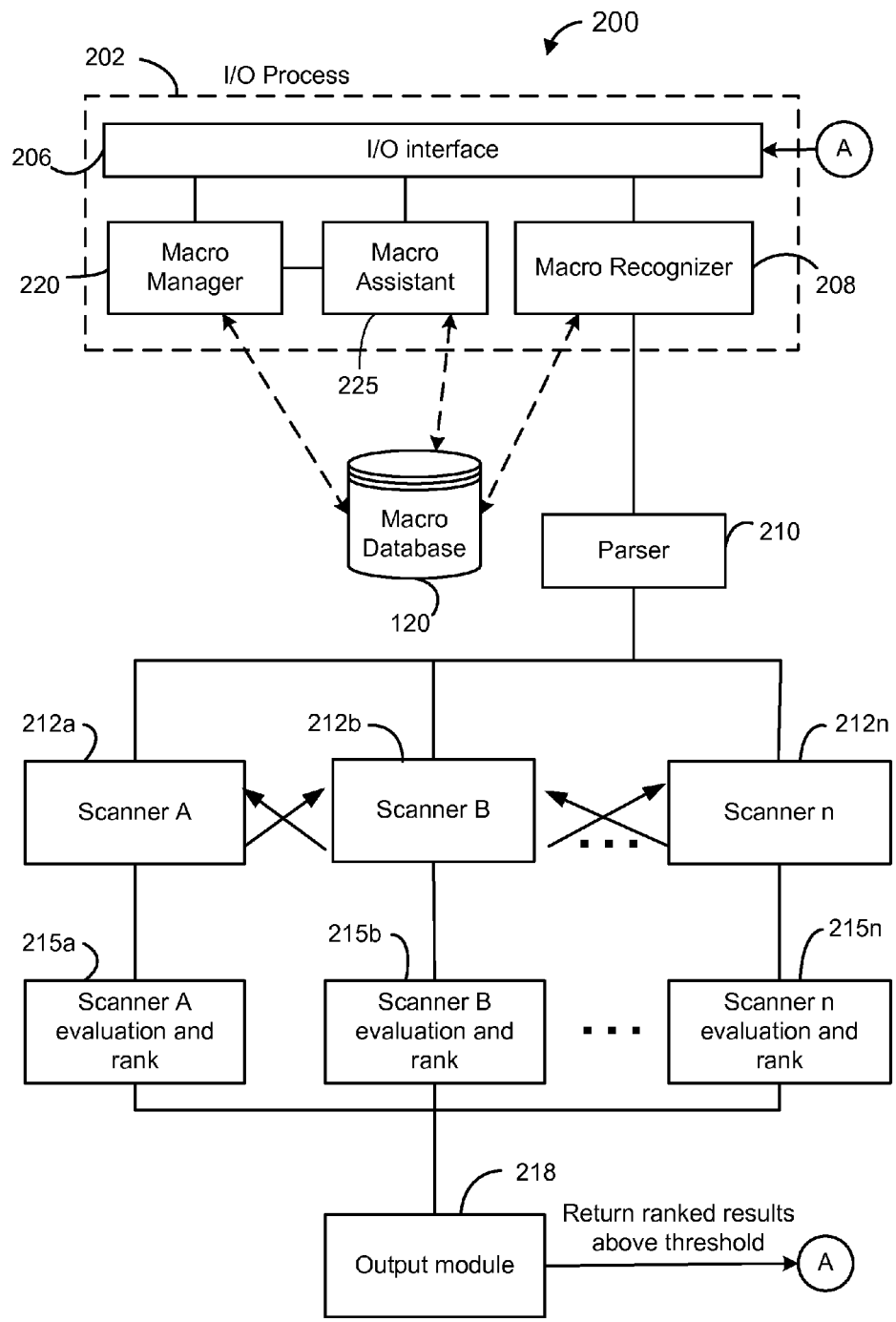
FIG. 2 is an embodiment of a natural language query answering engine.

FIG. 2 is diagram of an example NL query answering engine 200, according an embodiment. The NL query answering engine 200 includes an input/output (I/O) process 202, a parser 210, one or more scanners 212a-212n, one or more post processors 215a-215n and an output module 218.

In the example NL query answering engine 200, the I/O process 202 includes an I/O interface 206 that receives user inputs or NL queries. The I/O interface 206 may provide elementary error and consistency checking, for example, by performing spell-checking or ensuring that at least some characters are present. In addition to receiving NL queries, the I/O interface 206 also renders output corresponding to evaluated NL queries, such as a result generated by the output module 218, a status notification, a warning or an error message.

The I/O process 202 includes an NL macro recognizer 208 communicatively coupled to the I/O interface 206 and to the NL macro database 120. The NL macro recognizer 208 operates on the NL queries received by the I/O interface 206 and identifies any defined NL macros that are included in the NL queries. The macro recognizer 208 may access the macro database 120 to interpret the identified NL macros, and based on the interpretation, may translate or expand the NL macros into a corresponding macro value. The macro recognizer 208 substitutes the appropriate natural language macro values for identified NL macros included in the NL query, and forwards the revised, interpreted NL query to the parser 210. Continuing with the example discussed with respect to FIG. 1, if an NL query "What is the average snowfall in December for My Location?" is received by the I/O process 202, the revised, interpreted NL query "What is the average snowfall in December for Chicago, Ill.?" is delivered to the parser 210. NL queries that do not include any NL macros as identified by the macro recognizer 208 may simply be delivered to the parser 210 in their original form.

The parser 210 is a natural language parser, such as the natural language parser described in U.S. patent application Ser. No. 11/852,044. The parser 210 is configured to parse both original NL queries and interpreted NL queries in which NL macros have been replaced with NL macro values. The parser 210 examines the received NL query (whether original or interpreted) to extract keywords, group words into phrases, identify numerical expressions, categorize data, etc. The parser 210 may perform an initial go/no go analysis on the keywords, phrases, or numerical expressions to determine if there is enough information to proceed to a further step. When there is not enough information to make even a cursory pass at further analysis, the parser 210 may cause the user to be prompted, via the I/O interface 206, for additional information such as information that may clarify the information desired by the user. Alternatively, the I/O interface 206 may return the input unchanged along with a message that it cannot interpret the input, and/or that the input does not correspond to any defined macros.

In one implementation, the parser 210 may take an initial input and create tokens, and then assemble the tokens into one or more expressions in a precise syntax. In other words, the parser 210 may generally take input data in an imprecise syntax and generate expressions in a precise syntax. As an example, if a user enters the text "sin [x]<0.5", the parser 210 may create a plurality of tokens: "sin", "[x]", "<", and "0.5", where "sin" is recognized as a function name, "[x]" is recognized as a variable name, "<" is recognized as an inequality, and "0.5" is recognized as a real number. Then, the parser 210 may generate an expression in a precise syntax using these tokens.

Optionally, the parser 210 may perform additional or alternative processing. For example, the parser may attempt to identify phrases. Additionally, the parser 210 may attempt to rearrange tokens to see if the rearrangements match something that the parser 210 understands, such as a phrase. For instance, the parser 210 may utilize algorithmic rearrangements of the input. Also, the parser 210 may cause the user to be prompted to rephrase the input. Then, the parser 210 may analyze the original input in conjunction with the rephrased input. Further, the parser 210 may utilize machine learning techniques to identify language processing algorithms that work better than others. For example, for a user input query of "population Naples," the parser 210 may determine that the phrase "Naples" is a city, then determine whether the city is Naples, Italy or Naples, Fla., USA. The parser 210 may additionally determine that phrase "population" may mean "current population," "historical population," or "metro-area population."

The one or more expressions generated by the parser 210 may be provided to one or more scanners 212a, 212b, and 212n that may each have a particular focus. For example, scanner A 212a may be directed to developing a graphical plot for numerical expressions or phrases parsed from the input that can be reduced to a plot. As an example, if an input includes an expression, such as $x^2$, scanner A 212a may develop and output a plot of $x^2$ (i.e., a parabola). As another example, if the expression is Sin [x]<0.5, scanner A 212a may develop and output a plot of values of x that satisfy this expression. Other scanners may have other specific specializations, such as evaluating equations, determining roots, evaluating integrals, evaluating derivatives, determining relevant transforms, etc. Other specializations may include, for example, determining mathematical formulas, determining chemical formulas, determining physics formulas, determining financial formulas, determining engineering formulas, determining medical formulas, etc.

Still another specialization may include determining appropriate software programming language code (e.g., generating software programming language code). For instance, a scanner could receive data indicating a mathematical expression and generate software programming language code for evaluating the expression. As an example, a keyword or an expression related to ballistics may cause the scanner to generate software programming code for modeling the height of a projectile and code for modeling the distance of a projectile. In another example, input related to airflow over a wing may return code for modeling turbulent fluid flow over a surface or code for modeling lift and drag in a wing, or both.

Depending upon the application, more or less scanners may be utilized. For instance, if an application is to be devoted for use in a financial field, scanners related to chemical formulas may be omitted.

Some scanners may generate results based on a database query. For example, a scanner related to geometry formulas may query a database for keywords "area" and "triangle" for formulas related to those terms. As another example, a scanner may query a database for raw data needed to evaluate an expression. For instance, an expression may include c, the speed of light, and a scanner may query a database to retrieve a numerical value for c. As another example, an expression may require statistical data, such as a population of a particular city, state, or country needed to evaluate a "per capita" expression, and the scanner may query a statistical database to obtain the needed data. In yet another example, an expression may require real-time data such as "traffic congestion," and a scanner may query an appropriate database to obtain the desired real-time data.

Other scanners may generate results by synthesizing outputs. For example, a scanner for generating indefinite integrals may receive a mathematical expression and synthesize the indefinite integral of that expression, rather than searching a database of pre-generated indefinite integrals. Some scanners may be capable of doing database queries as well as synthesis of results. For example, the scanner related to geometry formulas may generate an expression for the area of a triangle based on a database query, but may also synthesize another expression by integrating parameter values into formulas retrieved from a database. In another example, a scanner querying data for the historical population of Naples, Italy over time may query for discrete population data points year by year, and may also synthesize the discrete data points into a graphical plot for display.

In addition to receiving data from the parser 210, each scanner may share results with each of the other scanners. Again, results generated by a scanner based on the shared results may also be shared with each of the other scanners, and so on. This process may continue until the scanners no longer have additional data to add, for example. Trivial transforms may also be recognized and blocked. When each scanner has contributed to both the original input from the parser 210 and shared input from all the other scanners, the results from each scanner to respective postprocessors 215a, 215b, and 215n. The postprocessors 215a, 215b, and 215n evaluate the results and may provide a ranking of each result by assigning a value (e.g., a percentage) to each result.

The ranked results may be passed to an output module 218 which may generate an output having the results with rankings above a certain threshold, while omitting results below the threshold. The threshold may be set at a predetermined level, or may be adjusted according to the number of results and a statistical analysis of the rankings. For example, a query that produces ten thousand results may adjust the threshold to a 99% relevance, thereby limiting the displayed results to the top 100. In another example though, where perhaps only a half a dozen results are returned, all the results may be displayed even though the rankings may be relatively low. The output of the output module 218 may comprise a web page, a window, or a portion of a display, etc., having one or more formulas, graphs, graphics, text or output in other formats. Typically, but not necessarily, the output generated by the output module 218 is presented by the I/O interface 206 at which the original NL query was received.

Particularly in a Web Services or comparable environment, scanners may be added or reconfigured based on user needs. For instance, feedback from users or an analysis of user queries may be utilized to add a scanner devoted to a new field (e.g., organic chemistry) or to add further formula data to an existing scanner. Similarly, scanners may be omitted or removed.

FIG. 2 illustrates the NL macro recognizer 208 as being included in the I/O process 202. In some embodiments, however, the macro recognizer 208 may not be part of the I/O process 202. For example, the macro recognizer 208 may be included in the parser 210 or some other component of the NL query answering engine 200. In some embodiments, the macro recognizer 208 may be a stand-alone executable application, an added feature or subsystem of a larger application separate from either the I/O process 202 or the NL query answering engine 200, or an applet accessed via a website, for example. Further, the macro recognizer 208 may also be implemented as a Web service with a Web browser implementing the user interface in a known manner.

In some embodiments, some portion or all of the I/O process 202 may be included at a client device, such as the client device 108 of FIG. 1. In some embodiments, some portion or all of the I/O process 202 may be included with the NL query answering system (e.g., the NL query answering system 104 of FIG. 1) at a centrally available device or group of devices, such as a server, a group of networked computing devices, a peer-to-peer network, a cloud computing network, or other centrally available device or group of devices.

The I/O process 202 or some portion thereof, or the NL query answering engine 200 or some portion thereof may be a stand-alone executable application with its own user interface. In some embodiments, the I/O process 202 or the NL query answering engine 200 could be an added feature or subsystem of a larger application such as a computational application (e.g., the MATHEMATICA® software system, a spreadsheet application, etc.). For example, the NL query answering engine 200 could be part of a "help" subsystem within a larger application. Additionally, the some or all of the embodiment 200 could be an applet accessed via a website, for example. Further, some or all of the embodiment 200 may also be implemented as a Web service with a Web browser implementing the user interface in a known manner. For example, the I/O process 202 could be browser plug-in or toolbar system.

The natural language query answering engine 200 of FIG. 2 may include a macro manager 220 and/or a macro assistant 225, each of which may be coupled to the I/O interface 206 and to the macro database 120, and, in some embodiments, may also be coupled to each other. Similar to the NL macro recognizer 208, the macro manager 220 and/or the macro assistant 225 may or may not be included in the I/O process 202. In some embodiments, the macro manager 220 and/or the macro assistant 225 may be included in the parser 210 or some other component of the NL query answering engine 200. In some embodiments, the macro manager 220 and/or the macro assistant 225 may each be a stand-alone executable application, an added feature or subsystem of a larger application separate from either the I/O process 202 or the NL query answering engine 200, or an applet accessed via a website, for example. Further, the macro manager 220 and/or the macro assistant 225 may also each be implemented as a Web service with a Web browser implementing the user interface in a known manner. Further details of the macro manager 220 and the macro assistant 225 are provided subsequently.

Figure 3:
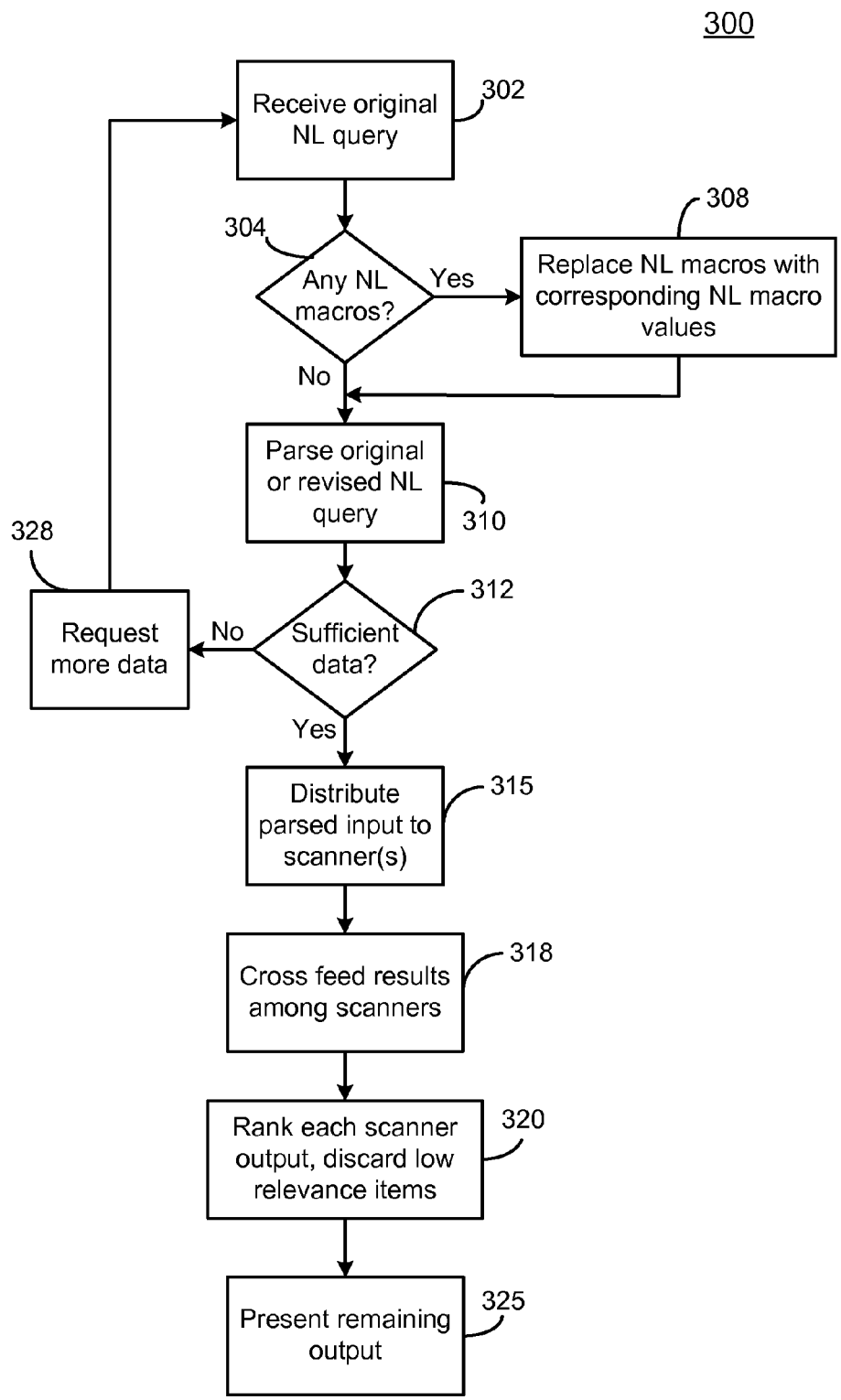
FIG. 3 is a flow diagram of an example method for providing one or more results to a user based on an input that is of an imprecise syntax or a natural language query.

FIG. 3 is a flow diagram of an example method 300 for providing one or more results to a user based on an input that is an NL query or of imprecise syntax. The method 300 will be described with reference to FIG. 2 for ease of explanation. It will be understood, however, that the method 300 may be utilized with systems other than the NL query answering engine 200, and that the NL query answering engine 200 may implement methods other than the method 300.

A natural language query or input of an imprecise syntax may be received at block 302. At block 304, the method 300 determines whether or not any natural language macros are included in the received NL query. If, at the block 304, the NL query is identified as including one or more NL macros, block 308 substitutes corresponding values for the identified NL macros into the originally received NL query to form a revised NL query. For example, the I/O interface 206 of FIG. 2 may receive the original NL query, and the macro recognizer 208 may identify any NL macros therein, access the macro database 120 to obtain corresponding macro values, create a revised NL query where any NL macros are replaced with their corresponding values, and make the revised NL query available to the parser 210.

If, at the block 304, no NL macros are identified as being included the original NL query, the original NL query is made available to the parser 210, e.g., the method 300 may proceed from the block 304 directly to block 310.

The NL query (whether original or revised) is parsed at the block 310. For example, the NL query may be analyzed to create data in a formal or precise syntax. When the parser 210 is able to determine a sufficient amount of data to proceed, a "yes" branch from a block 312 may be taken to a block 315. At the block 315, the parsed data (e.g., the output of the parser 210) is distributed to each of the plurality of scanners 212a, . . . , 212n. As described above, each scanner may examine the output of the parser 210 at the block 315 for areas of specific capability with respect to that scanner. When a scanner identifies data it can process, the scanner creates output specific to the input and then, at a block 318, the scanner may share its output with each of the other scanners. For example, the scanner 212a may create a mathematical expression and that mathematical expression may be delivered to scanners 212b and 212n. Scanners 212b and 212n may be able to synthesize output based on the expression from scanner 212a that they were not able to process from the input directly received from the parser 210. When each scanner can no longer synthesize meaningful output, the results are passed to the output module 218 at a block 320.

At the block 320, each output is ranked in terms of relevance. Output elements of low relevance optionally may be discarded. At a block 325, output elements that were not discarded at the block 320 are presented to the user, such as via the I/O interface 206. Output elements may be presented in rank order, or in the case of more common output elements, in a standard presentation format.

When the parser 210 cannot process the original or revised NL query, the "no" branch from the block 312 may be taken to block 328 and the user may be prompted for more information, e.g., via the I/O interface 206. Alternatively, the user may be prompted that the original NL query cannot be interpreted and the flow may return to the block 302 to receive a next input.

Figure 4:
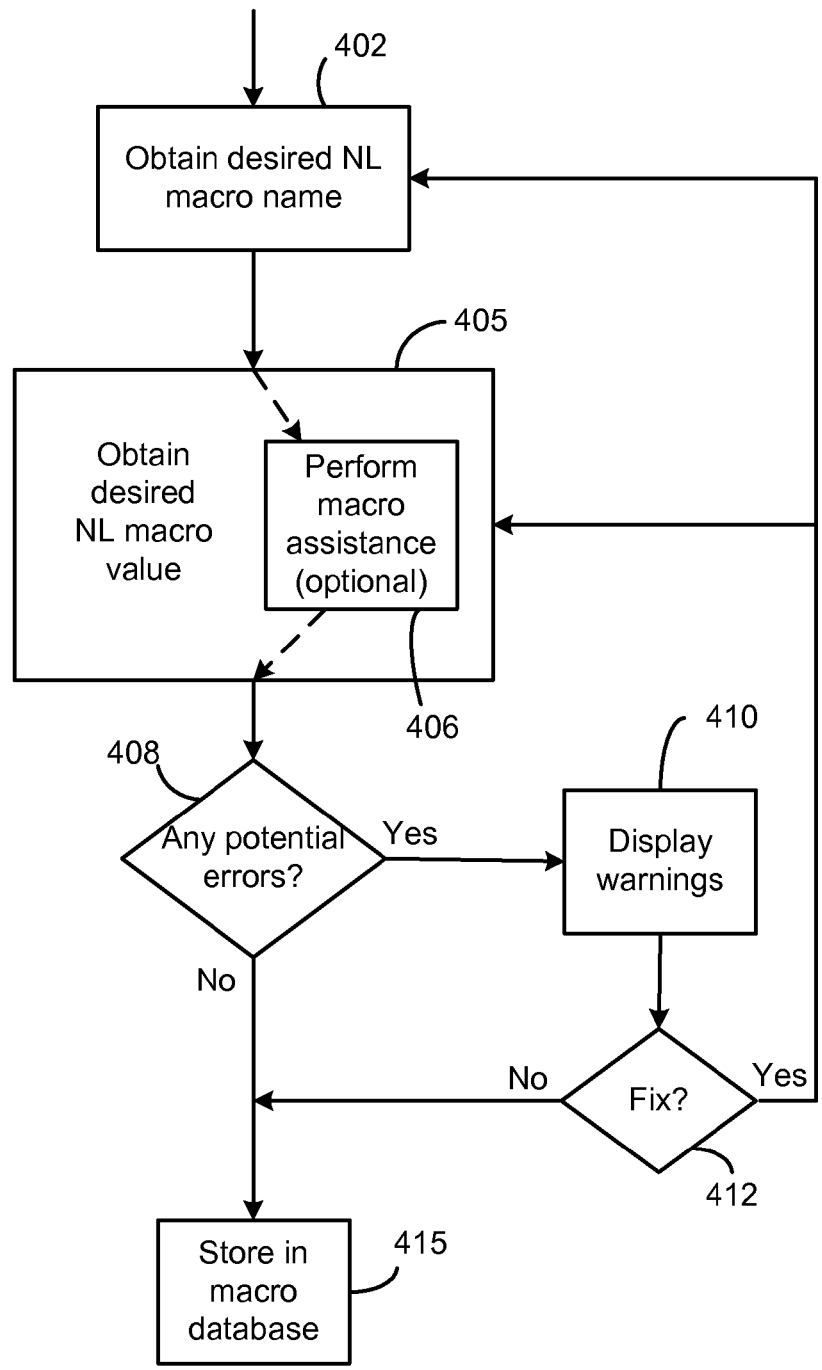
FIG. 4 is a flow diagram of an example method for creating or defining a natural language macro.

FIG. 4 is a flow diagram of an example method 400 for creating or defining a natural language macro. The method 400 will be described with reference to FIGS. 1 and 2 for ease of explanation. In an exemplary embodiment, the method 400 may be primarily performed by the macro manager 220 of the NL query answering engine 200, but also in conjunction with the I/O interface 206 and the macro database 120 as appropriate. It will be understood, however, that the method 400 may be utilized with and performed by systems other than the system 100 of FIG. 1 and the natural language query answering engine 200 of FIG. 2.

At block 402, a desired NL macro name is obtained. The desired macro name may be obtained, for example, from user input received at the I/O interface 206, or the desired macro name may be obtained from a received message or from a file. For example, if a user desires to define numerous macros, instead of manually inputting one macro definition at a time, he or she may provide a file from which the I/O interface 206 may obtain the input data for the numerous macros.

At block 405, a corresponding desired NL macro value is obtained. The desired NL macro value may be obtained, for example, from user input received at the I/O interface 206, or may be obtained from the same or a different received message or file as accessed for the NL macro name.

In some embodiments, obtaining the desired NL macro value 405 includes an optional step of performing macro assistance 406. In an example, the macro assistant 225 of FIG. 2 may primarily execute the step of performing macro assistance 406, but also in conjunction with the I/O interface 206, the macro manager 220, and the macro database 120, as needed.

Typically, performing macro assistance 406 includes suggesting a possible NL macro based on at least the NL macro name or first term or phrase obtained at the block 402. For example, if a desired NL macro name of "My Location" is obtained at the block 402, performing macro assistance 406 may include recognizing that the text "my location" is referring to a location and making an assumption that the text is referring to the user's current location. Then, performing macro assistance 406 may include determining a current location of the user via an IP address, cell towers, GPS information, or other information corresponding to a device at which the I/O interface 206 is displayed, or from which a user has entered the desired NL macro value. The current location may be displayed on the I/O interface 206 as a suggested NL macro value, and upon receiving an acceptance indication from the user, the method 400 may use the suggested NL macro value as obtained desired NL value and proceed to block 408.

More generally, performing macro assistance 406 may include recognizing and analyzing words, terms, phrases or other input in the desired NL macro name obtained at the block 402 from the present execution of the method 400, and in some cases, from one or more previous executions of the method 400. In some embodiments, the analysis may be additionally or alternatively based on, for example, one or more user preferences, user actions or activities, previously stored macros, previously received first and/or second terms or phrases, or other types of data that the NL query answering engine 200 has obtained or has deduced. Based on the analysis of the NL macro name, performing macro assistance 406 may include providing one or more suggested NL values. Upon receiving an indication of acceptance or upon receiving a selection of a particular suggested value by the user, the method 400 may accept the suggested value as the obtained desired NL value, and may proceed to the block 408.

In some embodiments, performing macro assistance 406 is executed prior to the block 402. For example, the NL query answering engine 200 may detect that a user has repeatedly used a same phrase in several previous NL queries (such as at the block 302 and/or at the block 310 during execution of the method 300), and based on the detection, the NL query answering engine 200 may perform macro assistance 405 by bringing the repeatedly-used phrase to the user's attention, and asking the user if he or she desires to create a macro for the repeatedly-used phrase. Upon receiving a positive acknowledgement, the block 402 may obtain a desired macro name (e.g., from the user) corresponding to the repeated phrase, and the remainder of the method 400 may be executed to define the suggested macro. In this scenario, however, the desired macro value need not be newly obtained at the block 405, as the desired macro value is effectively the identified, repeatedly-used phrase. Upon completing the definition of the suggested macro (block 415), flow may return back to the method 300 to continue with processing the query.

In some embodiments, performing macro assistance 406 may occur based on NL queries of more than one user. For example, in a company, if different users repeatedly use a same phrase across multiple NL queries, performing macro assistance 406 may include notifying a system administrator and asking if he or she wishes to define a new macro for the repeated phrase for use company-wide or for use by a select group of users.

At block 408, the desired NL macro name and its desired value may be analyzed for any potential errors. A potential error may include a mismatch in contexts, such as when a desired NL name is entered as "location" and the desired valued is entered as "polka dots." In one embodiment, the NL query answering engine 200 is configured to determine potential meanings or senses of words, phrases, and/or groups of textual characters. In this embodiment, the macro manager 220 may be configured to detect mismatches between meanings of NL macro names and NL macro values. For example, a NL macro name with the term "location" may be determined to refer to a physical location. The macro manager 220 may then detect when the NL macro value does not apparently correspond to a physical location. For example, the macro manager 220 may determine that the phrase "polka dots" does not appear to correspond to a physical location, while the phrase "Chicago, Ill." does appear to correspond to a physical location. Other potential errors may include a macro name and/or macro value that already exists in the macro database 120, a misspelling, a confusing homonym or homophone (e.g. does "bank" refer to a lending institution, a side of a river or a kind of a pool shot?) or other potential errors. If potential errors are identified at the block 408, one or more warnings or notifications may be displayed 410.

In response to potential error notification 410, if an indication is received at block 412 that corresponds to a user's desire to fix one or more of the potential errors, the method 400 returns to the block 402 or the block 405, as appropriate. If an indication is received at the block 412 that corresponds to a desire to ignore the potential errors, or if no potential errors are detected at the block 408, block 415 may store the defined macro and its value into a macro database, such as macro database 120.

In some embodiments, the macro stored at the block 415 may be persistent. For example, if a user logs in and creates the macro under an account, the stored macro may be stored in a macro database along with an indication of the corresponding account. When the user logs out, the macro may remain stored so that the user is able access the macro at a later time, such as via the method 200. In some embodiments, persistent macros may be stored at the block 415 for access by more than one user, such as when a system administrator defines a macro for use by a working group or across a company.

In some embodiments, the macro stored at the block 415 may be transient and not persistent. In these embodiments, the user is not required to log in or otherwise be authenticated in order to create macros, nor are the macros stored persistently in conjunction with an account. Instead, any transient macro created by the method 400 may exist while the user's corresponding session is open and be temporarily stored at the block 415, but after the user closes the session or the session is otherwise terminated, the created macro may be lost.

In some embodiments, the method 400 may be entirely performed by the natural language query answering system 104. In some embodiments, the method 400 may be entirely performed by a client device 108. In some embodiments, a first portion of the method 400 may be performed at the NL query answering system 104, and another portion may be performed by one or more client devices 108.

FIGS. 5A-7C depict different screen shots of natural language macro creation and usage. The illustrative context for FIGS. 5A-7C is the usage of natural language macros by employees of an outerwear company named "ACME Outerwear," but of course, the principles and techniques demonstrated by the screen shots of FIGS. 5A-7C may easily be applied to any context were natural language macros are desired or used. Each of FIGS. 5A-7C may be displayed in conjunction with the systems and methods disclosed herein, or may be displayed in conjunction with systems and/or methods other than those disclosed herein. Of course, the systems and/or methods of the present disclosure may produce screen shots other than those shown in FIGS. 5A-7C. For clarity, some of the descriptions for the screen shots in FIGS. 5A-7C refer to references in FIGS. 1, 2, 3 and 4.

Figure 5A:
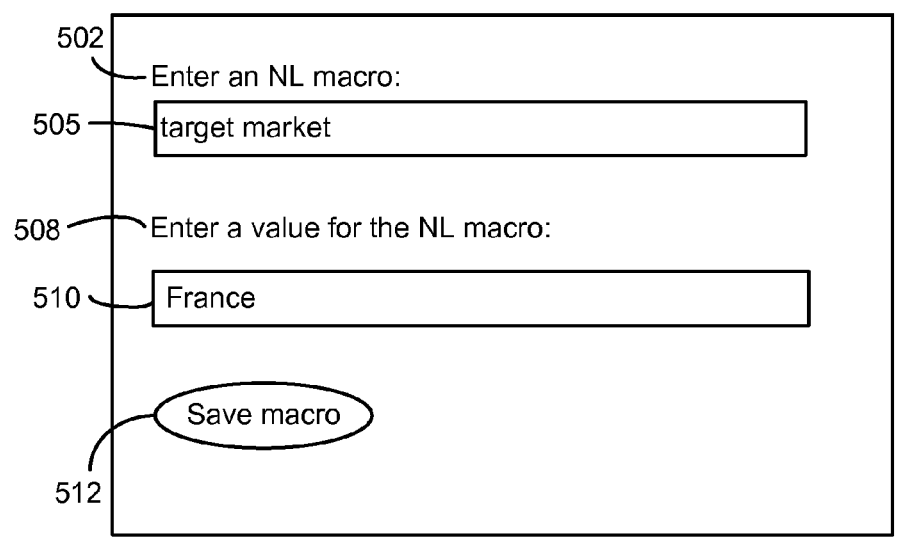
FIGS. 5A and 5B illustrate an example of defining a natural language macro and using it in a query.

FIG. 5A shows a screen shot 500 that illustrates defining a natural language macro. At a first prompt 502, the user has entered a desired natural language macro name "target market" 505, and at a second prompt 508, the user has entered a corresponding NL value "France" 510. Upon selection of the "Save macro" user control 512, the macro "target market" and its corresponding value "France" are stored. In an example, the screen shot 500 may be displayed using the I/O interface 206 of FIG. 2, the inputs 505 and 510 may be received by the I/O interface 206 and passed to the macro manager 220, the macro manager 220 may create an association between input 505 and input 510 so that input 505 may represent input 510 in NL queries, and the macro manager 220 may store the created macro in the macro database 120 upon an activation of the Save Macro" user control 512 that is detected at the I/O interface 206.

In some embodiments, an acknowledgement of a successful creation of the macro may be provided to the user, or, when appropriate (such as at the block 410 of FIG. 4), an indication of an unsuccessful creation or of one or more potential errors may be provided to the user.

Screen 500 may be displayed per user request, such as when a user selects a command to create a macro on a drop-down menu, when the user enters a textual command to create a macro, or when the user selects a corresponding "macro creation" icon on a tool bar or other screen location. Screen 500 may be a pop-up window, a separate screen, or a portion of an existing window on the display. In some embodiments, such as when a display is small (e.g., on a mobile device or cell phone), all of the display elements 502-512 may not be simultaneously visible on the display. Of course, the exact wording of prompts 502, 508 and 512 may differ from the wordings of screen 500, but may still convey a similar meaning, e.g., "New macro name:" for reference 502, "What value should I assign to [entered new macro name]?" for reference 508, or "Save?" for reference 512. Also, as both the macro name 505 and its value 510 are of natural language, a precise syntax for the user inputs 505 and 510 is not required. In fact, the user may input the macro name 505 and/or the macro value 510 using an imprecise syntax, different imprecise syntaxes, a combination of precise and imprecise syntaxes, or any desired syntax, for that matter.

Figure 5B:
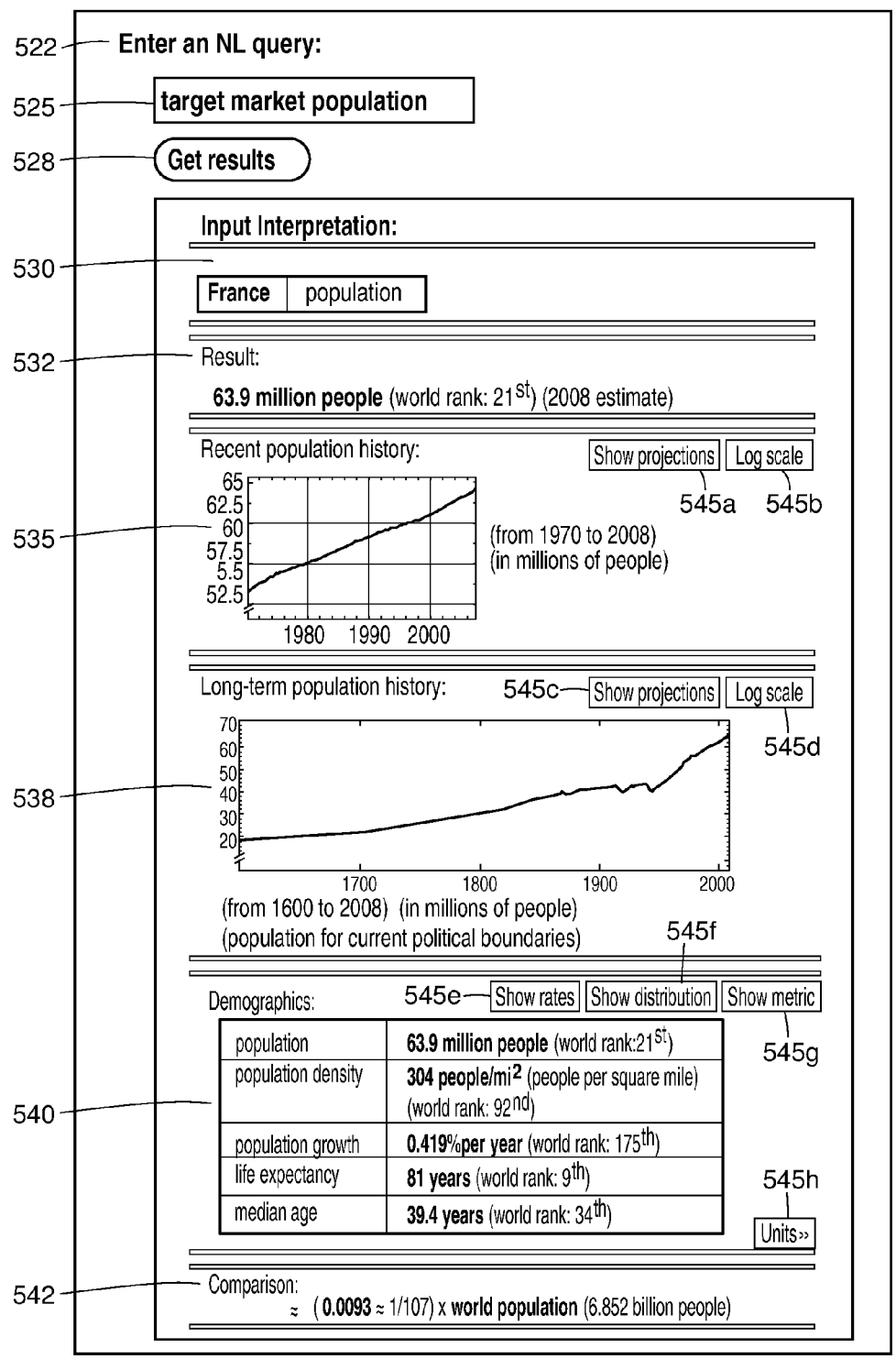

FIG. 5B illustrates a screen shot 520 that utilizes the macro "target market" created by the screen shot 500 of FIG. 5A. In response to a prompt 522, the user has entered "target market population" as a desired NL query 525. Upon activation of a user control 528, the NL query answering system 104 may respond with an input interpretation 530. In the embodiment illustrated by FIG. 5B, the input interpretation response 530 provides a revised interpretation 530 of the user input 525. Specifically, in this example, the input interpretation "France population" 530 shows that the macro "target market" included the original user input 525 has been replaced with its corresponding value "France." In some embodiments, the input interpretation 530 may provide the interpreted query input 525 without showing macro expansion, and in some embodiments both the user input with and without macro expansion may be provided by the input interpretation field 530.

The results and related information pertaining to the NL query "target market population" 525 (including therein the macro "target market") are displayed on the remainder of the user interface. In FIG. 5B, a numerical result 532, a recent graph of population history 535, a long-term graph of population history 538, demographic information 540, and a comparison to the world population 542 are provided. Of course, the format and content of the results 532-542 are exemplary only. In some embodiments, for the NL query "target market population" 525, a different set or combination of result contents using different formats may be provided. In fact, any format, number, or set of results pertaining to one or more answers to the natural language query may be displayed or presented.

The user interface may provide one or more user controls 545a-545h to manipulate the results and/or to provide additional data. For example, controls 545a, 545c, 545e and 545f each may be selected to show additional data related to the target market population. Controls 545b, 545d, 545g and 545h each may be selected to modify a format or display of the results. Other controls (not shown) may be additionally or alternatively included with the results of the NL query.

Figure 6A:
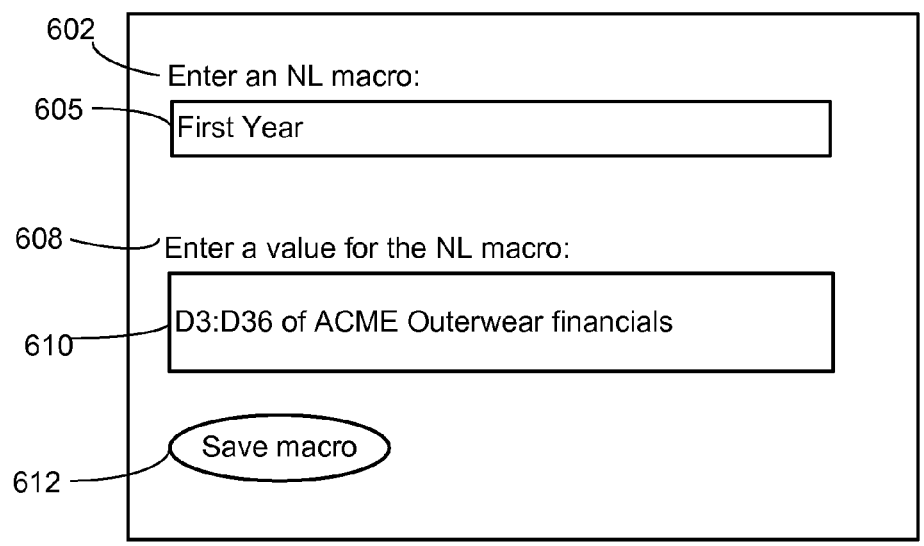

FIG. 6A depicts a screen shot 600 illustrating a definition of a natural language macro that references portions of a previously stored file that is accessible to the NL query answering system 104. At a first prompt 602, a user has entered a desired natural language macro name "First Year" 605, and at a second prompt 608, the user has entered a corresponding desired NL value "D3 to D36 of ACME Outerwear Financials" 610. In the illustrative context of FIG. 6A, "First Year" refers to a period of time, i.e., May of 2009 through May of 2010, and "ACME Outerwear Financials" is a company spreadsheet depicted in FIG. 6B as spreadsheet 620. FIGS. 6A and 6B are concurrently discussed for clarity.

In screen shot 600, the NL query answering engine 200 (and in some embodiments, the parser 210 of the NL query answering engine 200 in particular) understands the natural language text string "ACME Outerwear Financials" to refer to the company spreadsheet file 620. The company spreadsheet file 620 has been previously provided and stored, and is locally or remotely accessible to the NL query answering engine 200. In some embodiments, the spreadsheet file 620 may have been stored as part of the NL query answering system 104 (e.g., the file 620 may have been uploaded to the NL query answering system 104). In other embodiments, the spreadsheet file 620 may have been stored external to the NL query answering system 104, but still may be accessible to the NL query answering system 104 (e.g., the spreadsheet file 620 may have been stored at the client device 108, at some other location accessible via the network 112, or at some other location that is directly accessible by the NL query answering system 104 without traversing the network 112). In some scenarios, the file 620 may have been stored for access by only a particular user (e.g., stored in conjunction with a particular user's account), or the file may have been stored by a system administrator for access by a group of approved users. Typically, but not necessarily, the provided file 620 is accessible by a select group of one or more users, but is not publically or generally available. Of course, although the file in this example is a spreadsheet file, any type of provided file or provided data may be stored and accessed in conjunction with the systems and methods of the present disclosure. Any known mechanism for accessing information from a file or from data may be used in conjunction with this disclosure, including a database read, a function call, a message exchange, an operating system primitive, a read/write to a common location, a crawl such as a web crawl, a feed ingestion, or any other similar mechanism.

The NL query answering engine 200 (and in some embodiments, the parser 210 of the NL query answering engine 200 in particular) understands the natural language text string "D3 to D36 of ACME Outerwear Financials" to mean "cells D3 through D36 of the ACME Outerwear Financials spreadsheet." These cells and their corresponding cell values are linked to the macro name "FirstYear," and an indication of the association is stored in the macro database 120 upon user activation of user control "Save macro" 612 or equivalent. In some embodiments, not only is an indication of the cells D3-D36 stored, but some portion or all of the information in rows 3-36 corresponding to the cells D3 through D36 of the spreadsheet 620 (or indications thereof) may be stored in conjunction with the macro.

In some embodiments, the NL query answering engine 200 may not require particular cells of spreadsheet 620 to be named in the field 610. In an example, the user may input text into the field 610, e.g., "May 2009 through May 2010 of ACME Outerwear Financials." Based on the user input, the NL query answering engine 200 may process some relevant data within the provided file 620. For instance, the NL query answering engine 200 may determine that column D of the ACME Outerwear Financials spreadsheet 620 pertains to dates, and then may proceed to filter cells in Column D and/or their corresponding rows based on the values of column D that are determined to be included in "May 2009 through May 2010." An acknowledgement of a successful creation of the macro may be provided to the user, or an indication of an unsuccessful creation or of one or more potential errors may be provided to the user, if appropriate.

Screen shots 500 and 600 also illustrate the usage of imprecise syntax in user inputs 605 and 610. In particular, note that the user may or may not use capitalization (e.g., no capitalization in desired macro name 505 but capitalization is included in desired macro name 605), and the user may combine precise and imprecise syntaxes (e.g., "D3:D36 of ACME Outerwear Financials" in reference 610 uses both spreadsheet syntax and imprecise syntax). Of course, in addition to these examples of imprecise syntax, any other imprecise syntax may be used in either NL macro definition or NL value definition, including punctuation or lack thereof, abbreviations, underscores or other special characters, etc. Moreover, the imprecise syntaxes used in the fields 605 and 610 need not be the same imprecise syntax.

Figure 6C:
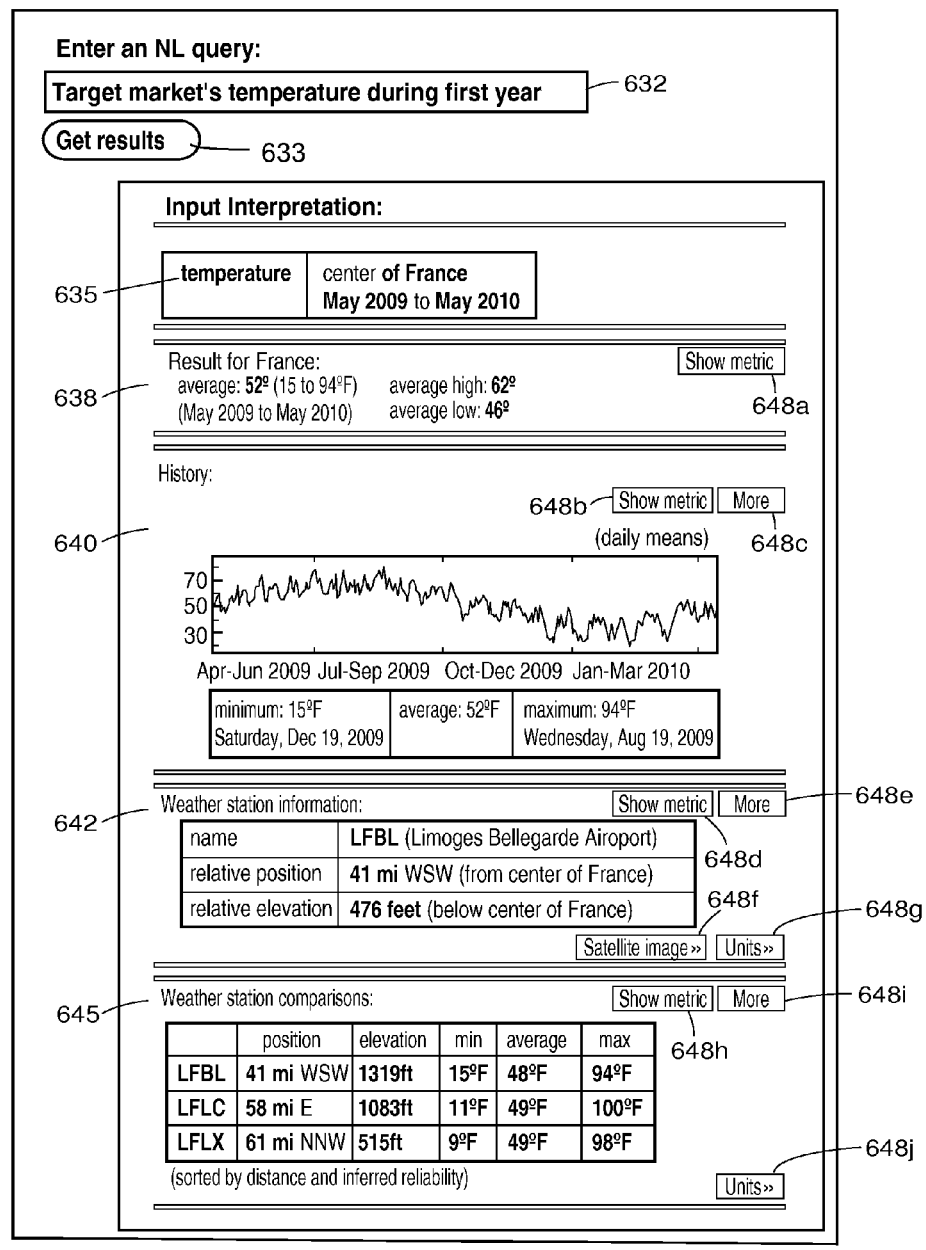

FIG. 6C is a screen shot 630 that illustrates the use of more than one macro in a single NL query. In screen shot 630, a user enters an NL query "Target market's temperature during First Year" 632. Both the macro "target market" defined in FIG. 5A and the macro "First Year" defined in FIG. 6A are used in the query 632. As the NL query answering system 104 does not require a precise syntax, note that the NL query answering engine 200 is understands both "target market" and "Target market's" to be "France". Also note that due to the natural language query answering system's ability to process imprecise syntax, the user may enter into field 632 text strings of different syntaxes to query for the same information, such as "First year target market temp" or "temperature of target market throughout the first year" instead of the text shown in the field 632.

Similar to FIG. 5B, upon user selection of a control 633, the natural language query answering system 200 may display an input interpretation 635 and one or more corresponding results 638-645. The input interpretation 635 of FIG. 5B illustrates the macro "Target market's" expanded to "France," and the macro "First Year" expanded to "May 2009 to May 2010." Accordingly, each of the presented results 638-645 is limited to temperature between May 2009 and May 2010. Also similar to FIG. 5B, one or more user controls 648a-648j may be included for selection to show additional information (e.g., 648c, 648e, 648f, 648i) or to show the results in a different format (e.g., 648a, 648b, 648d, 648g, 648h, 648j).

Figure 7A:
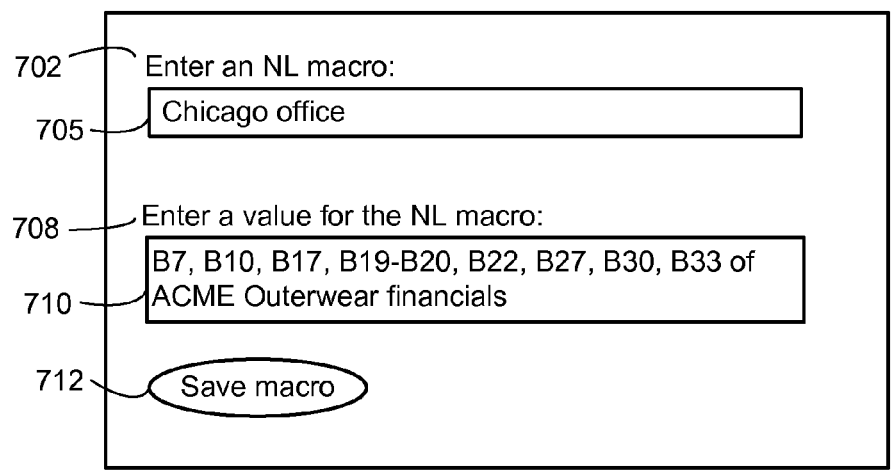
Figure 7C:
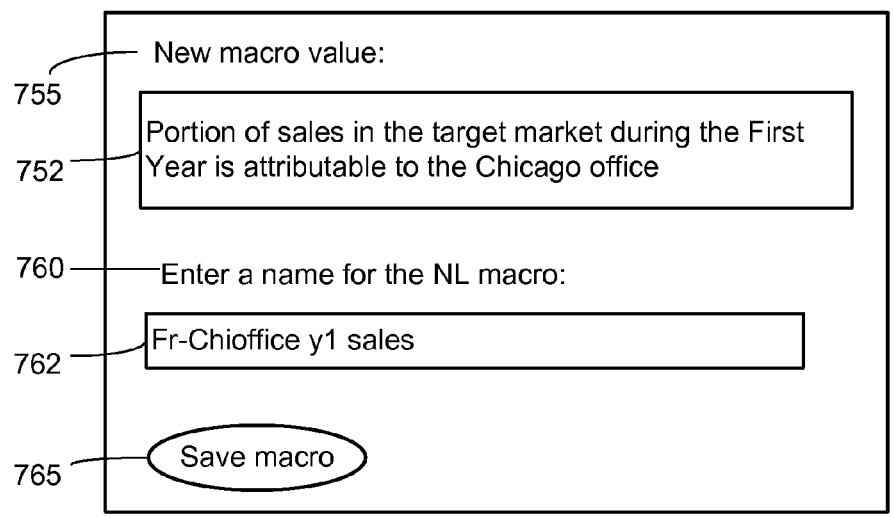

FIGS. 7A-7C are examples of natural language macros used by ACME Outerwear that reference the spreadsheet 620 of FIG. 6B. FIG. 7A illustrates a screen shot 700 that depicts defining a natural language macro to identify salespeople who work out of a particular office. At a first prompt 702, the user has entered a desired natural language macro name "Chicago office" 705, and at a second prompt 708, the user has entered a corresponding desired NL value "B7, B10, B17, B19-B20, B22, B27, B30, B33 of ACME Outerwear Financials" 710 to identify the salespeople A. Smith, B. Jones and C. Wilson. In this example, exact cell identifiers of the spreadsheet 620 are input by the user in the field 710. In other embodiments, instead of indicating exact cell identifiers, the user may use imprecise syntax that indicates a screening or filtering of information in the spreadsheet 620, e.g., "cells in column B of ACME Outerwear Financials whose contents equal Chicago." Upon selection of a user control 712 or equivalent, the macro "Chicago office" may be stored along with an indication of cells B7, B10, B17, B19-B20, B22, B27, B30, B33 and/or some or all of the contents of their corresponding rows, such as names "A. Smith, B. Jones, C. Wilson."

Similar to the screen shot 600 where the NL query answering engine 200 understands the natural language text string "ACME Outerwear Financials" to refer to a spreadsheet file 620, the NL query answering engine 200 (and in some embodiments, the parser 210 of the NL query answering engine 200 in particular) of the screen shot 720 refers to the ACME Outerwear file 620 of FIG. 6B that has been previously stored and is locally or remotely accessible to the NL query answering engine 200.

FIG. 7B illustrates a screen shot 720 that depicts a natural language query using all three of the aforementioned example NL macro and references the previously stored user data "ACME Outerwear Financials" 620. At a user prompt 725, the user has entered an NL query "What portion of sales in the target market during the First Year is attributable to the Chicago Office?" 728 or some other text string of imprecise syntax that conveys a similar meaning. The user has selected user control 730 to obtain an answer to the query 728. In this example, the NL query answering engine 200 (and in some embodiments, the macro recognizer 208 in particular) has replaced each macro with its value to form a revised query that is summarized in the input interpretation 732. However, similar to FIGS. 5B and 6B, in some embodiments, an interpretation of the input 728 without macro substitution may be displayed in the field 732, and in some embodiments, both interpretations with and without macro substitution may be simultaneously displayed in the field 732.

The revised user input may be processed by the natural language query answering engine 200 to determine one or more results. In some cases, the NL query answering engine may process a portion or all of information in the provided file 620 or provided data in order to determine the one or more results. In some cases, the NL query answering engine may process a portion or all of the information in the provided file 620 or data as well as process or access other information (e.g., publically or generally available information, other provided files, user history, etc.) to determine the one or more results.

In FIG. 7B, the results 735 are displayed in three different formats (738*a*, 738*b* and 738*c*), but, of course, this is only illustrative and any number of results in any number of formats may be displayed. In screen 720, a numerical result 738*a* is displayed, a pie chart of overall sales 738*b* is displayed, and a graph showing per office sales from May, 2009 through May 2010 (reference 738*c*) is displayed. To generate the results 738*a*-738*c*, the NL query answering engine 200 (and in some embodiments, the parser 210 in particular) has accessed the macro database 120 and the ACME Outerwear Financials spreadsheet 620 to gather data, and the scanners 212*a*-212*n* have operated on the parsed data accordingly to produce the output 738*a*-738*b*.

FIG. 7B illustrates an additional user control 740 that enables the user to save an NL query as a new NL macro. Upon activation of the user control 740, the screen shot 750 of equivalent of FIG. 7C may be presented. The NL query that was entered at reference 728 of FIG. 7B is presented in the field 752 in an exact or (as shown in FIG. 7C) a modified form, and identified accordingly 755 as the desired new macro value. At a user prompt 760, the user has input a desired NL macro name "Fr-Chioffice y1 sales" (reference 762), and may select user control 765 "Save macro" to save the association between the macro name 762 and the macro value 752. Accordingly, a future query that includes the macro "Fr-Chioffice y1 sales" will automatically utilize some or all of the results 738*a*-738*c* from FIG. 7B in a format that is suitable for to be used in an answer to the future query.

While the "Save macro" user control 740 of FIG. 7B is illustrated as a selectable button on a screen, the user may also define macro from a query result via other user control mechanisms, such as via an icon, a drop-down menu, a drag-and-drop (e.g., dragging the query 728 or the result 735 onto a macro creation icon or similar).

Figure 8:
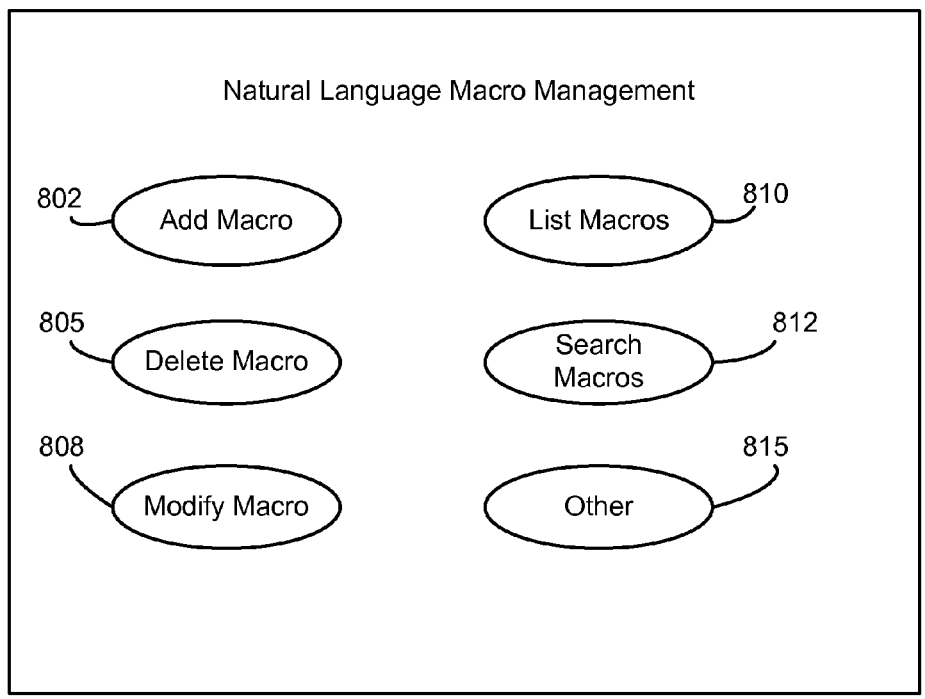
FIG. 8 depicts an embodiment of a user interface for managing natural language macros.

FIG. 8 illustrates a user interface 800 that allows users to manage macros. The user interface 800 may operate in conjunction with the methods and systems described herein. In an exemplary embodiment, the user interface 800 may be included in the I/O interface 206 of FIG. 2, and the macro manager 220 of the I/O interface 206 may operate on input received at the macro management user interface 800. The user interface 800 may be displayed as a pop-up window, on a tool bar, in a separate window, as a portion of an existing window, or some other display mechanism, however, in other embodiments (not shown), the user interface 800 may take other forms such as a drop down menu, icons, or direct in-line user commands.

User interface 800 includes one or more selectable options for managing macros, such as Add Macro 802, Delete Macro 805, Modify Macro 808, List Macros 810, Search Macros 812, and other macro management functions 815. Upon a selection of any of the options 802-815, the macro manager 200 of FIG. 2 may perform the corresponding macro management function at least in part by reading, writing, or otherwise accessing the macro database 120.

When one of the management functions 802-815 is selected, a separate screen, pop-up window or other user interface may be presented to obtain input needed to perform the selected function. For example, if the user selects Add Macro 802, a screen such as the screen 500 or the screen 600 may be displayed, and the user may enter input therein to define or add a new macro. Similarly, the Delete Macro 805 allows a user to invalidate a previously defined macro or remove it from the macro database 120. In some cases, a Delete Macro 805 function may include a verification such as "Are you sure you want to delete?" or similar. Modify Macro 808 allows a user to change a macro's name, the macro's value, or both.

List Macros 810 lists all defined macros. The list may be filtered based on a particular user account, a particular group of users, a date range of creation, user request, or some other criteria. The list may be sorted by user, groups of users, date of creation, or some other criteria. Search Macros 812 allows a user to enter a specific search term, string or characteristic, and returns a list of possible matches. For example, a user may wish to search for all financial macros defined for ACME Outerwear, or for macros created by the company's internal tools organization. In some embodiments, the Search Macro 812 function may search based on exact text or criteria matching of entered user input, and in some embodiments, the Search Macro 812 function may search based on user input entered in an imprecise syntax or natural language.

Any of the techniques described above, including the blocks described with reference to FIGS. 1-8, may be implemented using a processor that executes machine readable software or firmware instructions. Such computer program instructions may control the operation of a computing device such as a desktop computer, a laptop computer, a tablet computer, a workstation, a server, a mainframe, a mobile phone (e.g., a smart phone), a telephone, a set top box, a PDA, a pager, a processing system of an electronic toy, a processing system of an electronic game, a processing system of a consumer electronics device, etc. The computing device may have a processor and a memory in which the computer program instructions may be stored. The processor is coupled to the memory and executes the computer program instructions. The computer program instructions may be written in any high level language such as the programming language used with MATHEMATICA® software systems, C, C++, C#, Java or the like or any low-level assembly or machine language. By storing computer program instructions in a memory of the computing device, the computing device is physically and/or structurally configured in accordance with the computer program instructions.

While many methods and systems have been described herein as being able to be implemented in software instructions executed by a processor, they may be implemented in hardware, firmware instructions executed by a processor, etc., and may be implemented by a variety of computing systems and devices. Thus, one or more of the method blocks and system blocks described herein may be implemented in a standard multi-purpose central processing unit (CPU), a special purpose CPU, or on specifically designed hardware or firmware such as an application-specific integrated circuit (ASIC) or other hard-wired device as desired. When implemented in software instructions executed by a processor, the software routine may be stored in any computer readable memory such as on a magnetic disk, a laser disk (such as a compact disk (CD), a digital versatile disk (DVD)), a flash memory, a memory card, a memory stick, etc., or other storage medium, in a RAM or ROM of a computer or processor included in a CPU or a special purpose CPU, in any database, etc. Likewise, this software may be delivered via any known or desired delivery method including, for example, on a computer readable memory or other transportable computer storage mechanism or over a communication channel such as a telephone line, the internet, etc. (which are viewed as being the same as or interchangeable with providing such software via a transportable storage medium).

The present disclosure has been described with reference to specific examples, which are intended to be illustrative only and not to be limiting. It will be apparent to those of ordinary skill in the art that changes, additions or deletions may be made to the disclosed examples without departing from the spirit and scope of the disclosure.

What is claimed is:

1. A system for answering natural language (NL) queries, comprising:
    one or more memories of one or more computing devices, one or more memories storing machine readable instructions, and the machine readable instructions including:
        a first portion that, when executed by one or more processors, causes the system to:
            generate an association between a first term or phrase in an imprecise syntax and a second term or phrase in an imprecise syntax,
            store an indication of the association as a natural language (NL) macro, and
            determine whether a mismatch between a context of the first term or phrase and a context of the second term or phrase exists, including:
                determining a meaning of the second term or phrase,
                comparing i) the meaning of the second term or phrase with ii) a meaning of the first term or phrase, and
                determining whether a mismatch exists based on the act of comparing;
        a second portion that, when executed by the one or more processors, causes the system to generate one or more answers to NL queries; and
        a third portion that, when executed by the one or more processors, causes the system to:
            detect the first term or phrase in a user input that is received after the determination of whether the mismatch exists,
            replace, based on the stored indication of the association, the first term or phrase with the second term or phrase in the received user input to form a revised user input, and
            provide the revised user input as an NL query to be answered by the second portion, when the second portion is executed by the one or more processors.

2. The system of claim 1, wherein at least one of:
the first portion comprises i) a macro manager configured to a) cause the system to generate the association and b) determine whether the mismatch between the context of the first term or phrase and the context of the second term or phrase exists, and ii) a macro database configured to store the natural language macro;
the second portion comprises i) a parser configured to cause the system to generate one or more expressions in precise syntax based on the NL query and ii) a substystem configured to cause the system to generate the one or more answers to the NL query based on the one or more expressions in precise syntax; or
the system further comprises an input/output (I/O) interface coupled to the first portion, wherein the first term or phrase and the second term or phrase are obtained via the I/O interface.

3. The system of claim 2, wherein the mismatch between the context of the first term or phrase and the context of the second term or phrase is a first potential error, and the macro manager is further configured to cause the system to:
    determine a second potential error corresponding to at least one of the first term or phrase, the second term or phrase, or the association between the first term or phrase and the second term or phrase, and
    provide an indication of the second potential error.

4. The system of claim 1, wherein the first portion, when executed by the one or more processors, causes the system further to at least one of: modify the NL macro or provide an indication of the NL macro in response to a request.

5. The system of claim 1, wherein the first portion further comprises a macro assistant configured to cause the system to determine a suggested value of the second term or phrase.

6. The system of claim 5, wherein the macro assistant is configured to cause the system to determine the suggested value of the second term or phrase based on at least one of the context of the first term or phrase, a previously received first term or phrase, a previously received second term or phrase, a particular stored macro, a user preference, a user activity, or data corresponding to a user.

7. The system of claim 1, further comprising a mechanism to access stored user data, and wherein at least one of: the second term or phrase refers to at least a portion of the stored user data, or the second portion is configured to generate an answer to the NL query based on the at least a portion of the user data or based on at least another portion of the stored user data.

* * * * *